United States Patent [19]
Ellis

[11] Patent Number: 5,664,930
[45] Date of Patent: *Sep. 9, 1997

[54] VEHICLE ACTIVATED WHEEL CHOCK POSITIONING DEVICE

[75] Inventor: Elwood B. Ellis, Indian River, Canada

[73] Assignee: Rite-Hite Corporation, Milwaukee, Wis.

[*] Notice: The term of this patent shall not extend beyond the expiration date of Pat. No. 5,553,987.

[21] Appl. No.: 472,492

[22] Filed: Jun. 7, 1995

Related U.S. Application Data

[63] Continuation of Ser. No. 206,842, Mar. 7, 1994, abandoned.

[51] Int. Cl.$^6$ .................................................. B65G 67/00
[52] U.S. Cl. ........................................................ 414/401
[58] Field of Search .................................. 414/396, 401, 414/584; 188/32, 36, 4 R

[56] References Cited

U.S. PATENT DOCUMENTS

| | | | |
|---|---|---|---|
| Re. 32,968 | 6/1989 | Hahn | 414/401 |
| Re. 33,154 | 1/1990 | Hahn et al. | 414/401 |
| Re. 33,242 | 6/1990 | Hipp et al. | 414/401 |
| 2,413,744 | 1/1947 | Carter | 280/179 |
| 2,773,564 | 12/1956 | Gerard, Sr. | 188/32 |
| 3,110,466 | 11/1963 | O'Sullivan | 248/119 |
| 3,221,907 | 12/1965 | O'Sullivan | 188/32 X |

(List continued on next page.)

FOREIGN PATENT DOCUMENTS

| | | | |
|---|---|---|---|
| 1308222 | 8/1988 | Canada . | |
| 0 302 356 | 7/1988 | European Pat. Off. . | |
| 0 384 850 | 8/1990 | European Pat. Off. . | |
| 0 580 415 | 1/1994 | European Pat. Off. . | |
| 0 639 488 | 2/1995 | European Pat. Off. . | |
| 05357075 | 4/1995 | European Pat. Off. . | |
| 0 537 075 | 4/1995 | European Pat. Off. . | |
| 2 284 481 | 4/1976 | France . | |
| 2394423 | 2/1979 | France | 188/32 |
| 2652340 | 3/1991 | France | 414/401 |
| 2 672 578 | 8/1992 | France . | |
| 2682343 | 4/1993 | France . | |
| 2 689 845 | 10/1993 | France . | |
| 27 35 826 | 2/1979 | Germany . | |
| 3830891 | 3/1990 | Germany | 414/401 |
| 42 42 415 | 2/1994 | Germany . | |
| 60-36230 | 3/1985 | Japan . | |
| 0157253 | 7/1978 | Netherlands | 410/30 |
| 1036593 | 8/1983 | U.S.S.R. | 188/32 |
| WO 95/18029 | 7/1995 | WIPO . | |

OTHER PUBLICATIONS

Brochure re Combar product (German) 4 pages.
5 Color photographs of Combar product.
4 page Dyna Seal brochure of Wheelblocker—translation.
2 pages of reduced blueprints of Pentalift.
2 page brochure—"Kelly Auto Chock Truck Restraint".
4 pages from a German publication *Barrometer* dated Nov. 1994.
5 pages of German Info Bulletin—"Stertil"—Combilok—Vrachtwagenblokkering.
Copies of 7 photographs of the Auto Chock installation at the Ford Detroit Parts Facility—believed to have been taken in Jun. 1991.

*Primary Examiner*—David A. Bucci
*Attorney, Agent, or Firm*—Leydig, Voit & Mayer, Ltd.

[57] ABSTRACT

A system for loading and unloading a vehicle, including: a vehicle actuated wheel chock positioning device for at least one tire of such a vehicle which is rotatable on a treadway between an initial position and a plurality of operating positions, the chock positioning device including a mechanism engageable by such tire at the initial position and movable with the tire as it rolls on the treadway, a chock positionable behind the tire when the mechanism is in any of the operating positions in response to engagement of the mechanism by the rolling tire, and a controllable lock capable of selectively locking the chock in a chock position behind the tire corresponding to one of the operating positions, the system, in one preferred embodiment further including a leveling ramp carrying the chock positioning device with the ability vertically position the device and a vehicle chocked thereby to a selectable vertical position.

10 Claims, 12 Drawing Sheets

U.S. PATENT DOCUMENTS

| | | | |
|---|---|---|---|
| 3,305,049 | 2/1967 | Willey | 188/32 |
| 3,447,639 | 6/1969 | Parr | 185/32 |
| 3,542,157 | 11/1970 | Noah | 188/32 |
| 3,666,118 | 5/1972 | Raynes et al. | 414/401 |
| 3,667,160 | 6/1972 | Salloum | 49/35 |
| 4,013,145 | 3/1977 | Mumm | 188/32 |
| 4,122,629 | 10/1978 | Rennick | 188/32 X |
| 4,146,888 | 3/1979 | Grunewald et al. | 340/679 |
| 4,191,503 | 3/1980 | Neff et al. | 414/401 |
| 4,207,019 | 6/1980 | Cone | 414/373 |
| 4,208,161 | 6/1980 | Hipp et al. | 414/401 |
| 4,264,259 | 4/1981 | Hipp | 414/401 |
| 4,267,748 | 5/1981 | Grunewald et al. | 74/529 |
| 4,282,621 | 8/1981 | Anthony et al. | 14/71.1 |
| 4,373,847 | 2/1983 | Hipp et al. | 414/401 |
| 4,379,354 | 4/1983 | Hahn et al. | 14/71.3 |
| 4,443,150 | 4/1984 | Hahn et al. | 414/401 |
| 4,472,099 | 9/1984 | Hahn et al. | 414/401 |
| 4,560,315 | 12/1985 | Hahn | 414/401 |
| 4,572,080 | 2/1986 | Williams et al. | 104/252 |
| 4,605,353 | 8/1986 | Hahn et al. | 414/401 |
| 4,634,334 | 1/1987 | Hahn et al. | 414/401 |
| 4,653,967 | 3/1987 | Isaksson et al. | 188/32 X |
| 4,674,941 | 6/1987 | Hageman | 414/401 |
| 4,676,344 | 6/1987 | Locicero | 188/32 |
| 4,695,216 | 9/1987 | Erlandsson | 414/401 |
| 4,728,242 | 3/1988 | Erlandsson | 414/401 |
| 4,759,678 | 7/1988 | Hageman | 414/401 |
| 4,765,792 | 8/1988 | Cherry et al. | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,861,217 | 8/1989 | Erlandsson | 414/401 |
| 4,865,508 | 9/1989 | Carlson | 414/401 |
| 4,915,568 | 4/1990 | West | 414/401 |
| 4,938,647 | 7/1990 | Erlandsson | 414/401 |
| 4,963,068 | 10/1990 | Gelder | 414/401 |
| 4,969,792 | 11/1990 | Ellis et al. | 414/401 |
| 4,973,213 | 11/1990 | Erlandsson | 414/401 |
| 5,096,021 | 3/1992 | Tart | 188/32 |
| 5,249,905 | 10/1993 | Warner et al. | 414/401 |
| 5,302,063 | 4/1994 | Winsor | 188/32 X |
| 5,375,965 | 12/1994 | Springer et al. | 414/401 X |

30" DIAMETER

36" DIAMETER

42" DIAMETER 5,664,930

VEHICLE ACTIVATED WHEEL CHOCK POSITIONING DEVICE

This application is a continuation of U.S. patent application Ser. No. 08/206,842, filed Mar. 7, 1994, now abandoned, which application was assigned to the same assignee as the present application and which is hereby incorporated herein by reference.

FIELD OF INVENTION

This invention relates to vehicle actuated wheel chock positioning devices and, in one embodiment, to those which are provided with a self leveling platform.

BACKGROUND OF THE INVENTION

Although the trucking industry has some standards, most are a result of federal regulations. For example, trucks delivering goods over a vehicle supporting surface to a dock may be a tractor and trailer, a tractor trailer and pup, or a straight van. Throughout this specification and the appended claims "treadway" is used to refer to every vehicle supporting surface in the broadest sense, including but not limited to roads, driveways, ramps, bridges, pits, levelers or the like. In all those situations the position of the wheels in relation to a treadway, to a dock position, and to one another may vary. Therefore there exists a need to position a chock at a specific chock position in relation to the vehicle wheel, the treadway or an associated loading dock or other loading facility. In this description, wherever the term "dock," "loading dock," "dock position" or like term is used, it is intended broadly to include raised loading docks, fluid terminals and loading stations of all kinds wherever positive and safe positioning of a vehicle is desired. Furthermore, the term "tire" includes a wheel and tire rotatably mounted on a vehicle.

Also as the height of the rear of the truck may not be standardized a dock leveling device may be necessary as the trailer is loaded or unloaded. It is known to raise/or lower the trailer level to coincide with the dock or dock leveling device as the truck is unloaded/loaded. It is therefore imperative that the trailer be chocked for safe loading and unloading of the trailer regardless of the type of vehicle being serviced or the position of the vehicle wheel relative to the loading dock.

Such a trailer leveler with a chock is found in U.S. Pat. No. 4,969,792 assigned to Kelley. However, with trailers with a floating third axle, as best seen in FIG. 1 illustrating this prior art, the chock may be rendered ineffective for chocking.

There is therefore a need in the industry to provide an automatic chock positioning device which chocks the trailer, pup, or van while automatically being positioned regardless of the positioning of the wheels in relation to one another and the dock.

Therefore it is a primary object of this invention to provide an automatic vehicle activated chock positioning device.

It is a further object of this invention to provide such a chock positioning device built into a dock location and treadway.

It is a further object of this invention to provide a loading ramp which may be raised to such an extent that it provides in combination with a dock leveler, an exit, entrance ramp from/to the warehouse for material handling trucks.

Further and other objects of the invention will become apparent to one skilled in the art when considering the following summary of the invention and the more detailed description of the preferred embodiments illustrated herein.

SUMMARY OF THE INVENTION

According to a primary aspect of the invention there is provided a vehicle actuated wheel chock positioning device for at least one tire of such a vehicle which is rotatable on a treadway between an initial position and a plurality of operating positions, the chock positioning device including: a mechanism engageable by such tire at the initial position and movable with the tire as it rolls on the treadway; a chock positionable behind the tire when the mechanism is in any of the operating positions in response to engagement of the mechanism by the rolling tire; a connector between the mechanism and the chock; and, a controllable lock capable of selectively locking the chock in a chock position behind the tire corresponding to one of the operating positions. In one embodiment the mechanism may be a resiliently biased arm which engages dock side portions of the leading tire and once engaged the continued movement of the trailer chocks a lagging portion of the tire proximate the loading/unloading position as effected by the movement of the trailer to the docking position. In this embodiment the connector is a movable dolly.

According to a preferred embodiment of the invention the automatic chock positioning device may be disposed on or in a treadway adjoining a loading dock and in one embodiment within a pit adjacent the dock. The chock positioning device may be disposed with a self leveling ramp the chock positioning device including a connector movable from an initial position to a plurality of operating positions, one of which becomes the chock position upon actuation of a controllable lock.

According to yet another aspect of the invention there is provided an automatic wheel chock positioning apparatus comprising a supporting member having a first and second end and being pivotally supported proximate one end thereof on a supporting surface and moveable substantially vertically proximate the other end thereof for leveling the floor of a trailer in relation to a fixed loading dock or, alternatively, a movable dock plate provided with the loading dock, the supporting member having a recessed channel provided therein. The supporting member has at least one vehicle activated wheel chock positioning device as described above mounted therewith for vehicle activated movement from an initial position whereat said wheel chock positioning device is located away from the dock end of the supporting member so as to readily engage the leading tire of a vehicle, to operating positions where said wheel chocking device is disposed behind a leading tire of the vehicle and moves with said tire to the operating position for chocking where the lock is activated to provide the chock position. The device preferably has a dolly or other connector movable in the channel and connecting and carrying both the actuating mechanism engaged by the tire and the chock. The chock position is established by a lock that provides interconnection between the supporting member and the connector to restrict motion of the connector toward the initial position. The lock is selectively deactuated to permit the device to return to the initial position.

In one embodiment the locking device further comprises a movable member within said channel wherein said member locks the dolly at the chock position, preferably said dolly including detent means provided therewith to engage with detent means disposed with the moveable member to lock the dolly at the chock position. Preferably the movable member is moved in the channel by drive means and preferably a hydraulic cylinder. In one embodiment the member has ratchet like teeth and notches which engage with ratchet like teeth disposed on the bottom of said dolly.

In another embodiment the leading means of the dolly is resiliently biased in order to accommodate variable sizes of tires.

According to yet another aspect of the invention the supporting member may further comprise a secondary guide channel for a guide member of the lagging means or chock arm of the dolly wherein when the dolly is moved from the initial position the secondary guide guides the lagging means or chock arm from the initial position to the operating position.

BRIEF DESCRIPTION OF THE DRAWINGS

The invention will now be illustrated with respect to the following drawings illustrating embodiments of the invention of which.

DETAILED DESCRIPTION OF PREFERRED EMBODIMENTS OF THE INVENTION

Figure 1:
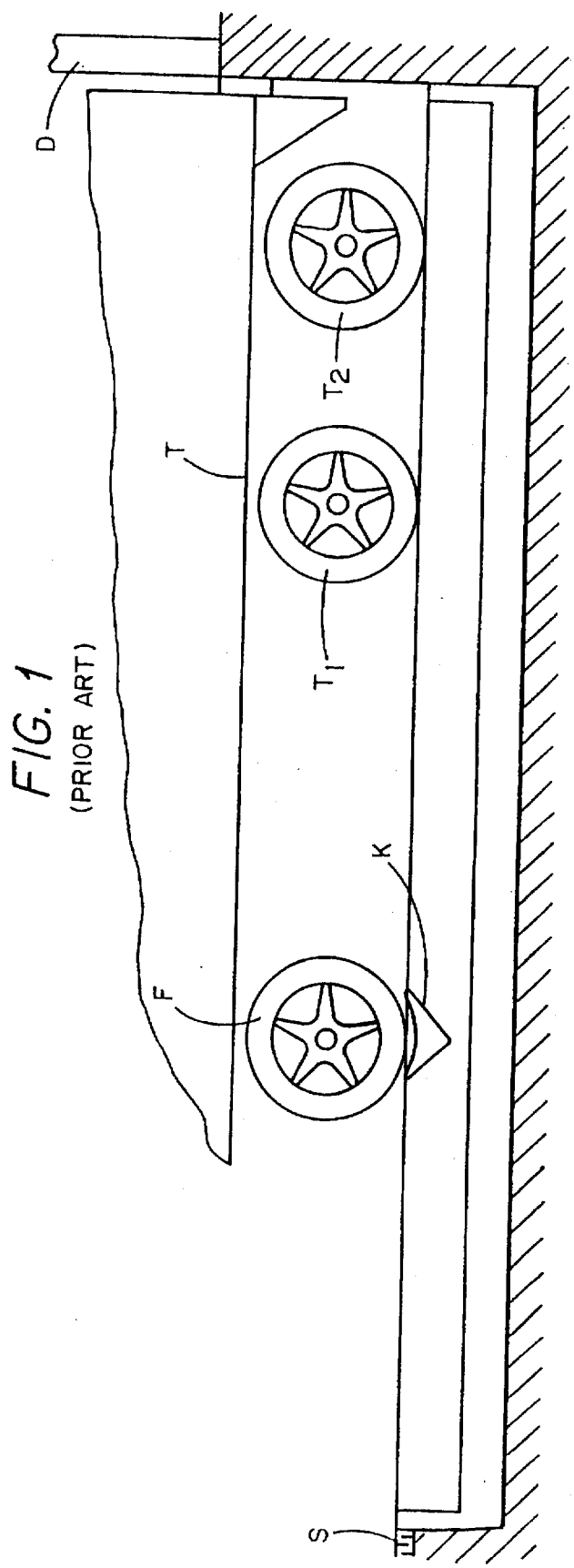
FIG. 1 constitutes prior art as described in the background of the invention.

Referring now to FIG. 1 the prior art is illustrated showing a trailer T docked on a roadway surface S at a dock D. The dock has provided therewith an unloading device for chocking the wheels of the trailer as taught by the prior art Kelley U.S. Pat. No. 4,969,792. Because of the ability of the chock to move from the dock entrance a total of 16 feet, should the trailer be using a floating axle F which is quite common in today's trucking industry then the dimensions of the device as taught in the Kelley patent will prevent the chock K from coming out of the holding pocket and being moved up against the fire T1. This is a very hazardous condition as now the truck is being loaded or unloaded without a proper chocking system having a positioning and chocking device.

Figure 2:
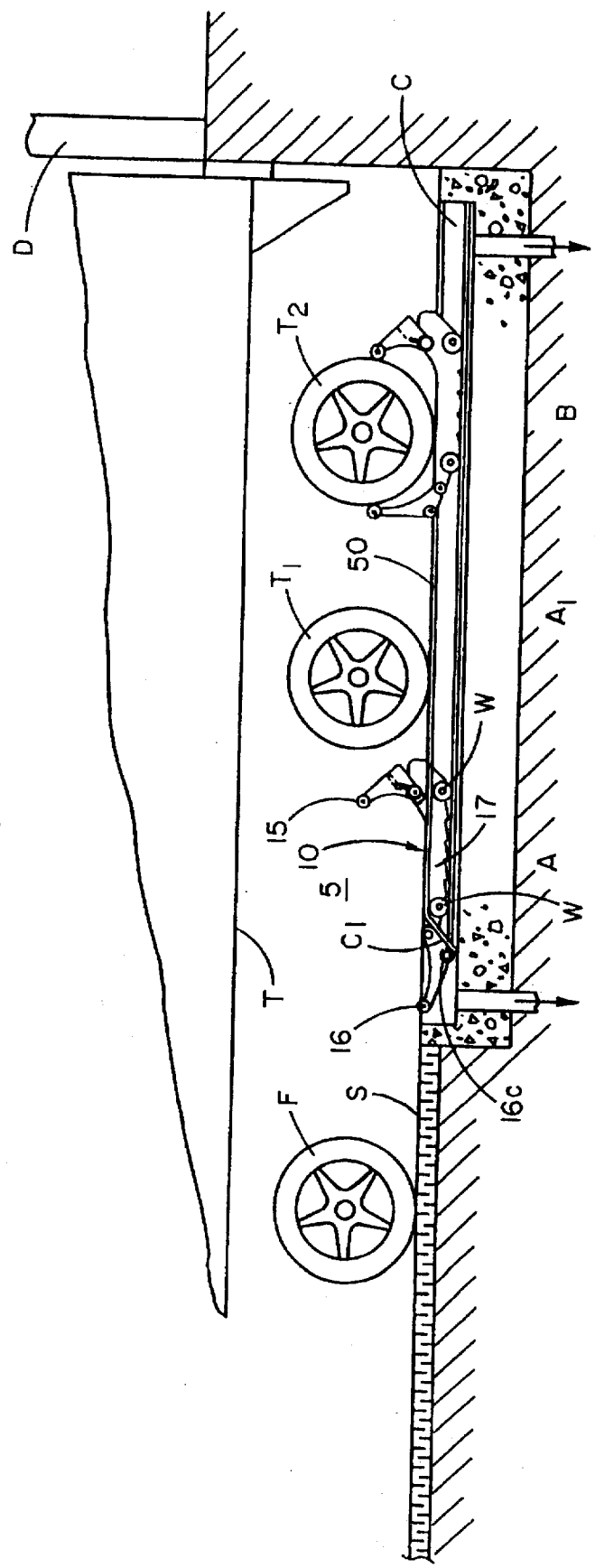
FIG. 2 is a side schematic view of the invention illustrated in a preferred embodiment of the invention.
Figure 7:
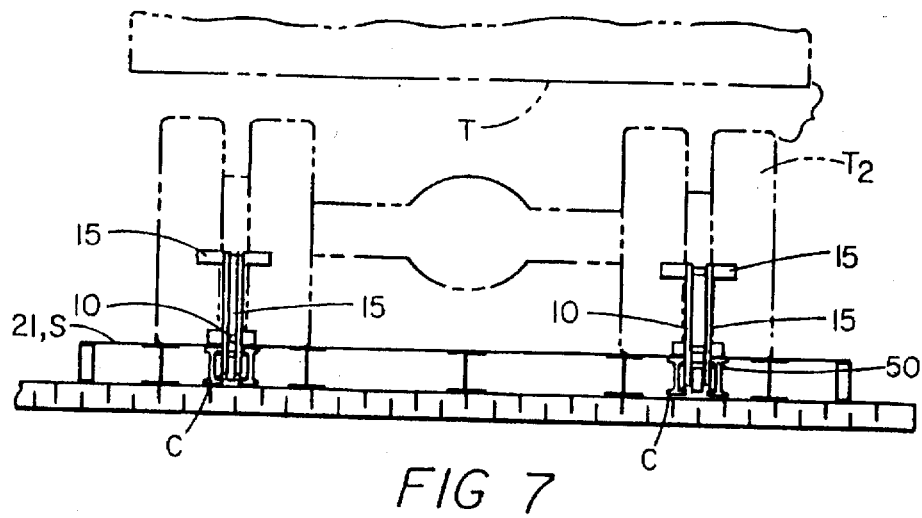
FIGS. 7 and 8 are end schematic views of the invention installed within a platform 50, as seen in FIG. 3, as viewed from the dock (FIG. 7) and facing the dock (FIG. 8) respectively, and illustrating the tire chocking from both sides of the tire T2.

Referring now to FIG. 2 there is illustrated a chocking system having a positioning and chocking device of the present invention with a trailer T being docked at a conventional dock D with the chocking device 10 being movable from a position A through a position $A_1$, to a position B, as the rear tire T2 first engages the arm 15 of the chocking device 10, thereby moving the chocking device in the channel C to position B wherein the chocking device is in the fully chocked and locked position. It is noted that the chocking device at all times captures the leading rear tire T2 so that no prospect of misusing the device is potentially possible. The chocking device 10 is provided with a leading arm 15, and a mechanism including a lagging arm 16 engaged with a connector in the form of dolly 17. The dolly 17 is part of a system 5 including channel C and is movable on wheels W within channel C when the rear most tire T2 engages the arm 15 at position A. In doing so, the arm 16 which is normally beneath the surface of the treadway S, will be drawn up by the rearward motion of the dolly 10 as the movement of tire T2 forces the dolly to move toward the most rearward position B. In doing so, the arm 16 will, because of incline cam surface $C_1$, of the channel C, cause the roller of arm 16 and specifically roller 16c to ride on the incline portion $C_1$ until such time as the roller 16c rests on the top edges of surface 50 and cannot move to any other position but the upwardly inclined position, as best seen at position B of FIG. 2. In this position the chock is fully activated and is preferably locked. As best seen in FIG. 7, chocking may take place on one or both rear tires T2.

Since the chocking device of the present invention engages the rear most accessible tire of the trailer, pup or van, there is no possibility of the chocking device failing to chock the wheels and specifically the rear most accessible wheel T2 of the trailer T.

Figure 3:
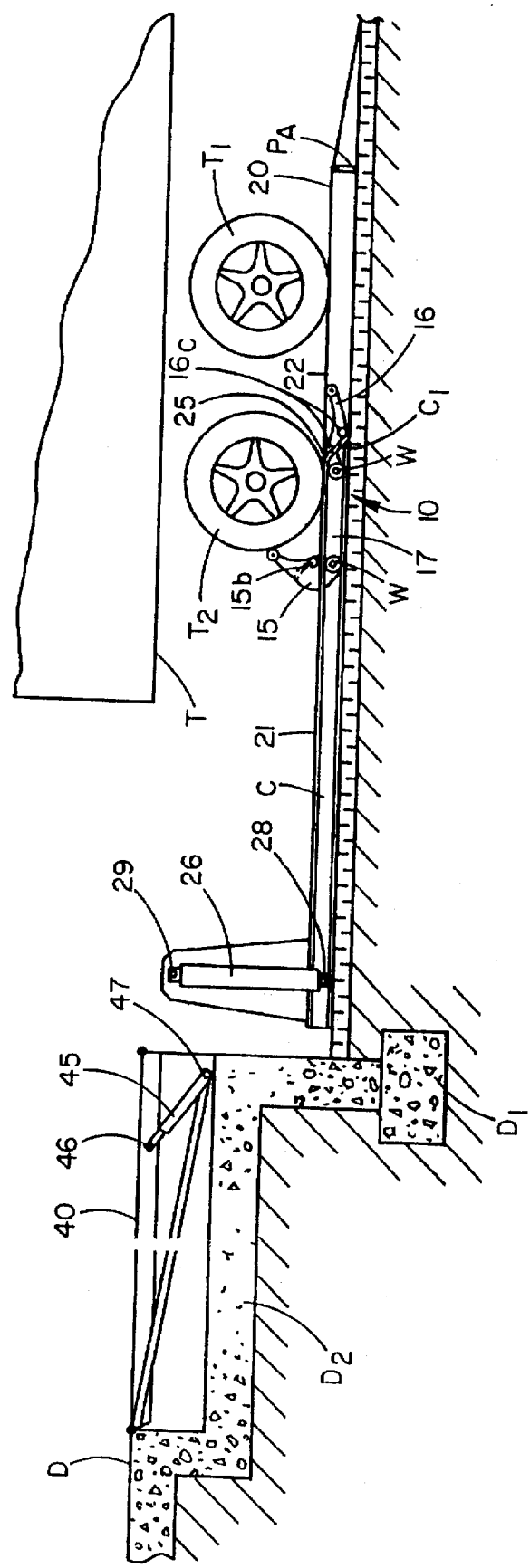
FIG. 3 is a side schematic view of the invention integral with a loading platform illustrated in a preferred embodiment of the invention.
Figure 4:
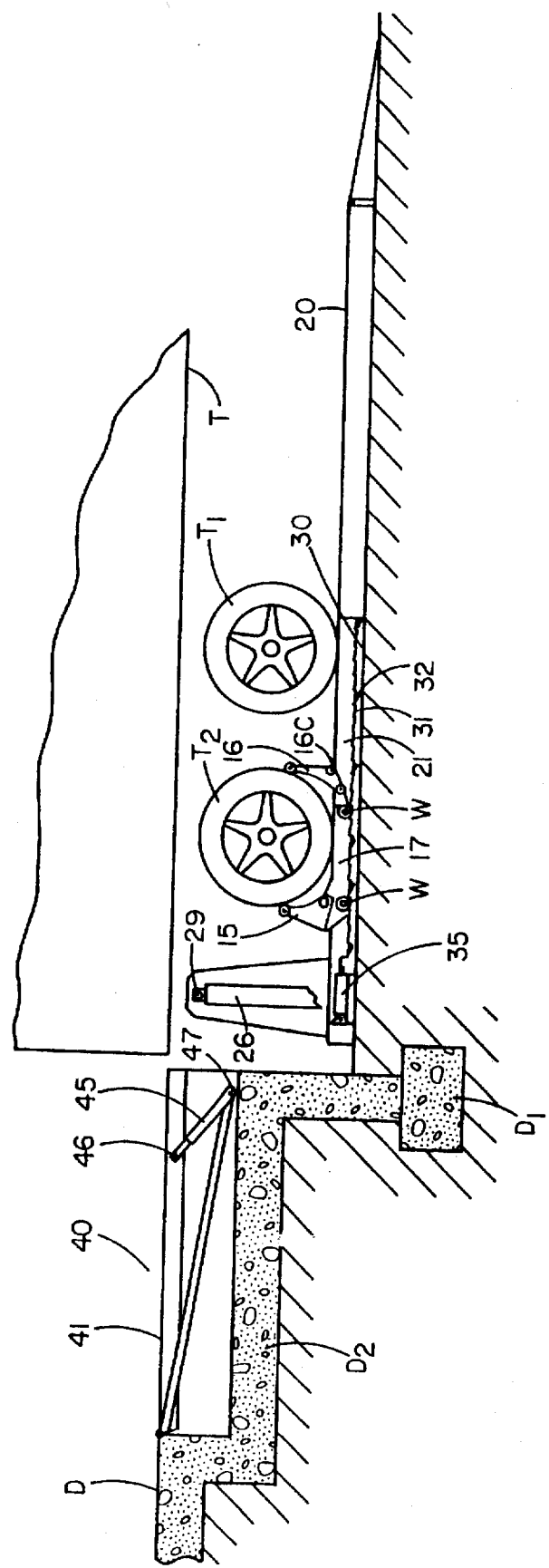
FIG. 4 is a similar view to that of FIG. 3 illustrating the most rearward tire T2 of a trailer T being fully chocked, when the trailer T is proximate the dock D.
Figure 5:
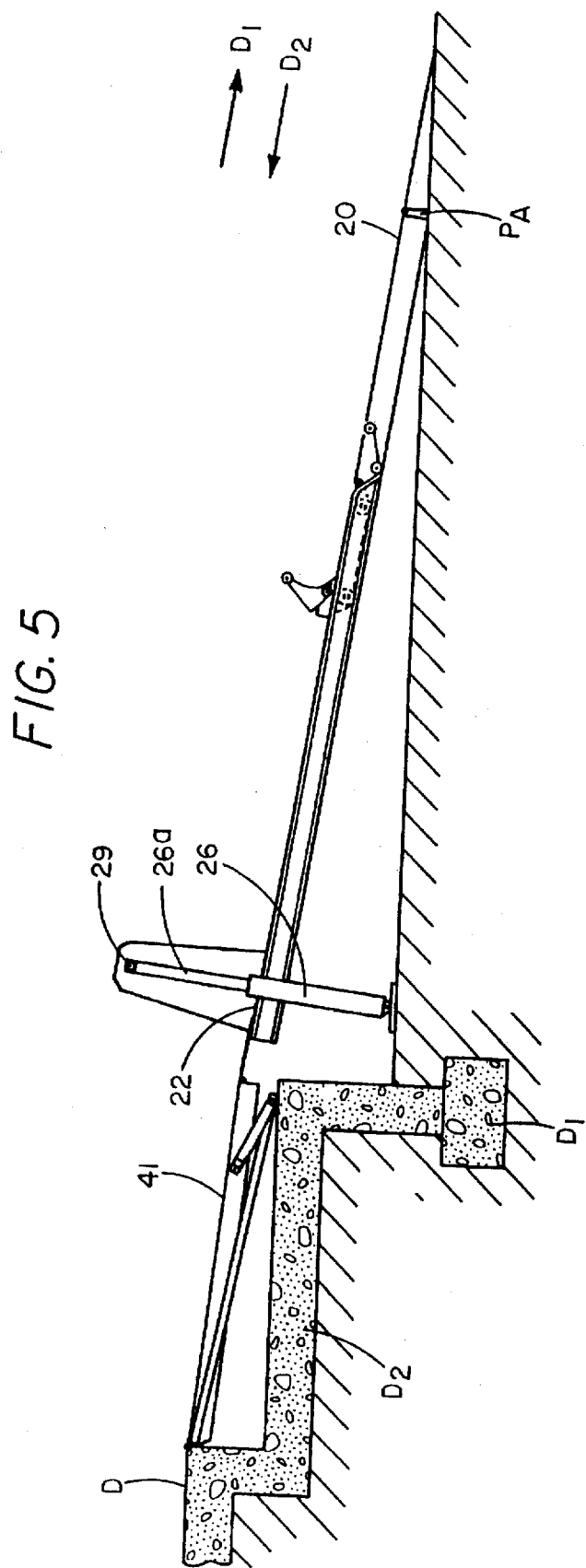
FIG. 5 is a side schematic view of the invention of FIG. 4 with the trailer having departed and the platform portion 20 being pivoted to provide in combination with the self leveling dock plate 41 an entrance or exit ramp to the dock D for material handling trucks, and illustrated in a preferred embodiment of the invention.
Figure 6:
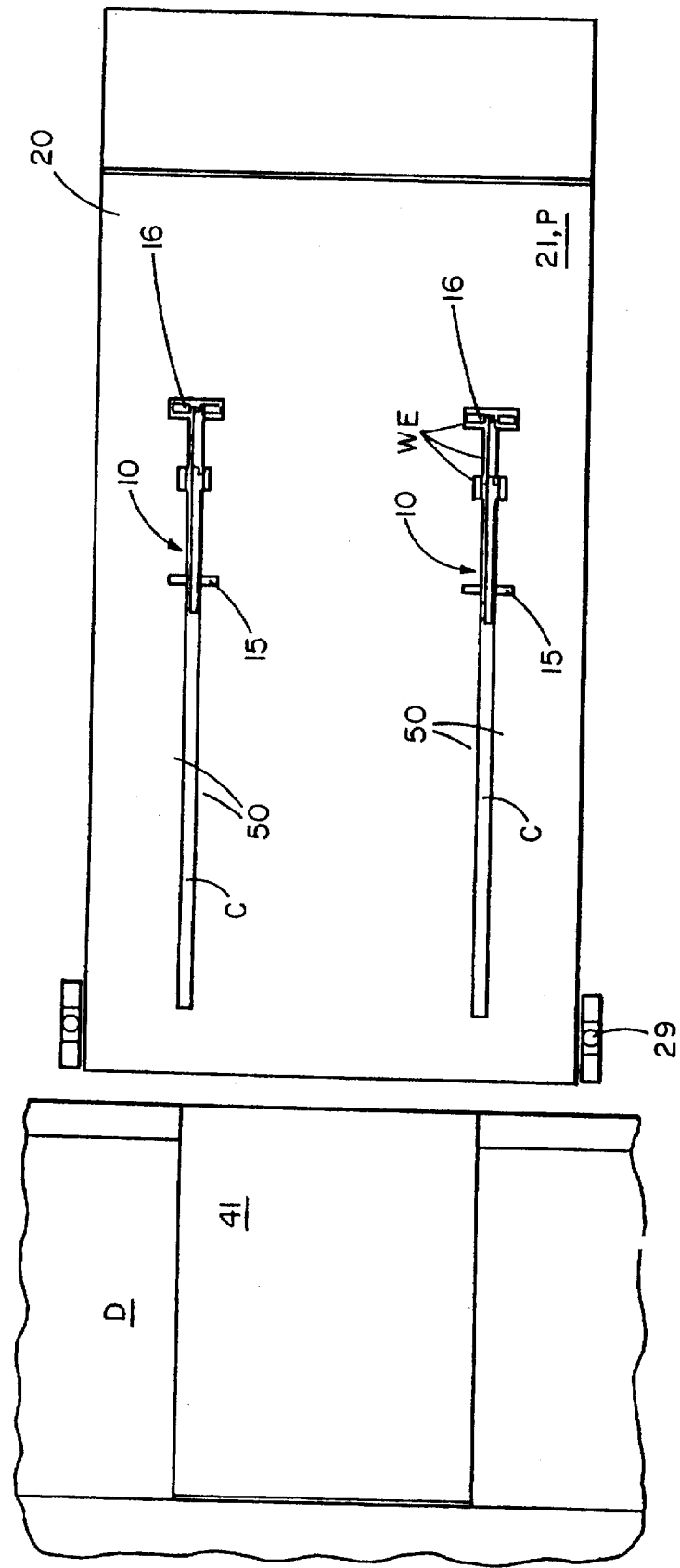
FIG. 6 is a top plan view of the invention of FIGS. 3, 4 and 5.
Figure 10:
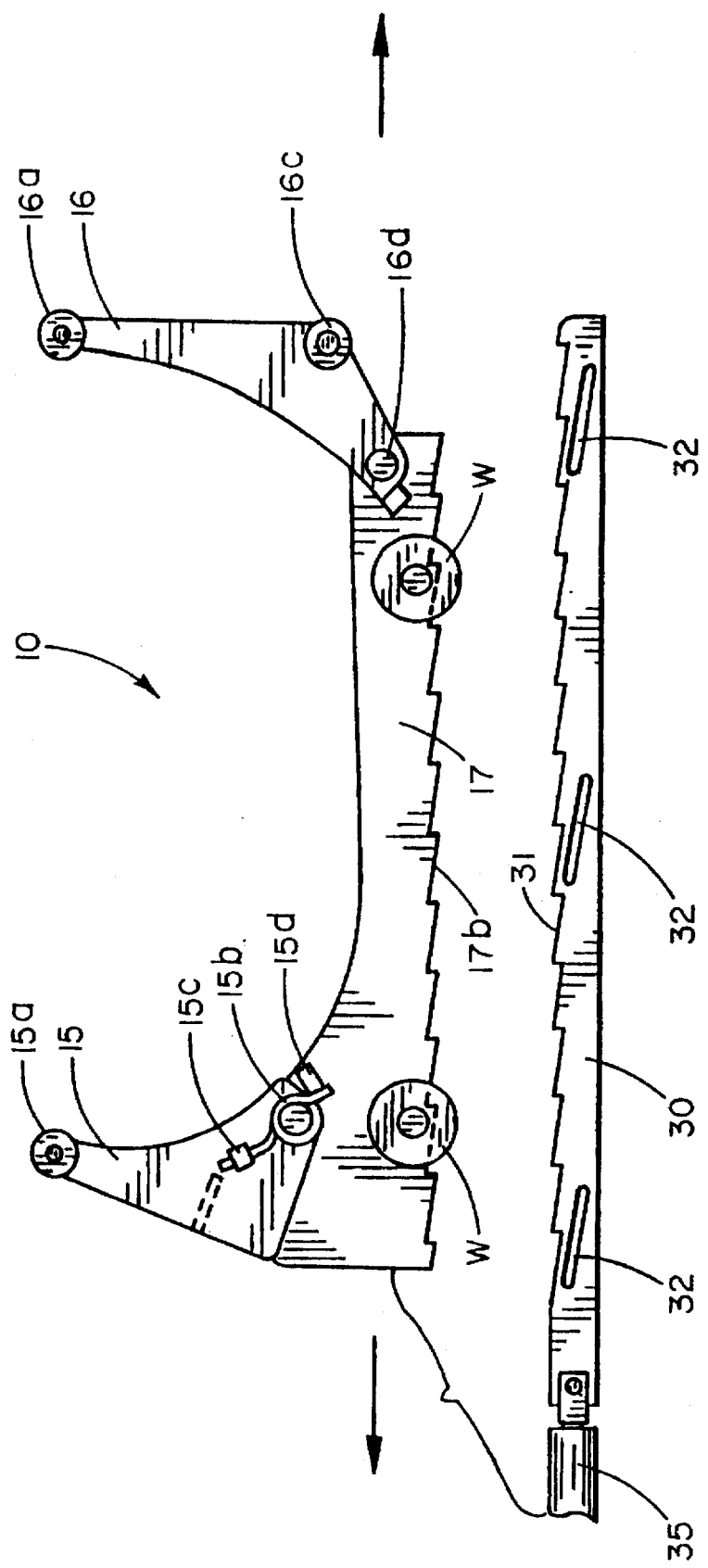
FIG. 10 is a side exploded view of the components which provide the locking of the dolly 10 within the channel C of the unloading ramp and illustrated in a preferred embodiment of the invention.

Referring now to FIGS. 3 and 6 there is illustrated another embodiment of the invention wherein the chocking device 10 is installed with a movable support such as platform 20 where the combined apparatus works in combination with a leveling dock plate 40 disposed with dock D. The support 20 therefore has a support surface 21 which is movable by a cylinder 26 to allow for variances in height of the trailer floor in relation to the dock, when the trailer is being loaded and unloaded. The support 20 also provides for some degree of leveling as well. The support 20 therefore includes a pivot Pa proximate the front thereof about which the support 20 will move, as best seen in relation to FIG. 5. The chocking device as best seen in relation to FIG. 6 in conjunction with FIGS. 3 and 4, is disposed in channel C and arm 15 is engaged therefore by the leading tire T2 shown here on both sides of the vehicle in a position substantially shown in FIG. 3 where arm 15 which is biased by a torsion spring 15b engages the tire T2 as it moves toward the dock D. The arm 16 therefore at that particular point in time remains below the surface of the support 20, until such time as the roller 16c is carried up the cam surface $C_1$ as the dolly 17 moves toward the dock D. The roller 16c will eventually rest on the edges of surface 50 above channel C and the tires rest on the surface 21 of the support 20, capturing the other side or the lagging tread surface of the tire T2. Continued motion of the tire T2 toward the dock results in the dolly moving to the position as best seen in FIG. 4, wherein both the leading tread surface and the lagging tread surface of tire T2 are captured by arms 15 and 16 respectively, with the roller 16c being firmly positioned on the top edges of surface 50 above channel C so as to prevent the arm 16 from moving downward and therefore providing a very positive chocking device 10. A ratcheting type locking bar 30 as best seen in relation to FIG. 10 is operated by a hydraulic cylinder 35 to draw in the ratchet portions 31 on the bar 30 and the slots on the bar, guided by portions, not shown,shown, of the channel C in relation to the ratchet portion 17b found on the bottom of the dolly 17, thereby locking by ratchet action the dolly in its finally locked chock position adjacent the dock. The truck is now in a safe position to be loaded and unloaded.

Referring now to FIG. 5 there is illustrated the support 20 with the dock end 22 being substantially vertically moved to a position cooperating with the docking plate 41 and together providing an exit or entrance ramp for material handling trucks to and from the dock and the driveway. In this position as best seen in FIG. 6, the chocking devices are separated by approximately 6 feet and material handling trucks can move in between without any problem.

Referring to FIG. 6 there is clearly illustrated the top view of the support 20 and support surface 21 in relation to chocking device 10. The slot in channel C and the ability of the chocking device to be truck actuated and move from its initial position shown at the front of channel C to the rear of the channel C adjacent the dock D and the dock plate 41 are also illustrated. The leading arm 15 always is engaged by the tire T2 at first and the lagging arm 16 lies within a well WE as best seen in the shaded area of FIG. 9, until such time as the truck tire T2 engages the arm 15 and the arm 16 is drawn up by the movement of the rollers 16c against the incline cam $C_1$ of the channel C.

Figure 8:
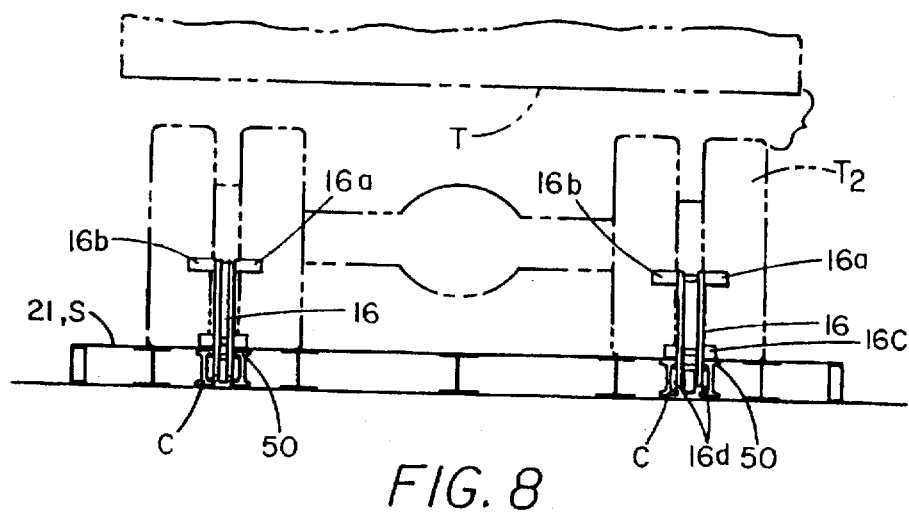

Referring to FIGS. 7 and 8 in conjunction with FIG. 2 there is illustrated the chocking device 10 installed in a simple channel permanently positioned along the supporting surfaces. The supporting member 50 with the top defining a supporting surface 21 therefore has channel C provided therewith within which the chocking device 10 will move from a position wherein the arm 16 is substantially below the top surface 21 of the supporting member 50 to a position as best seen in FIG. 8. Rollers therefore 16a and 16b are provided with the arm 16 to engage the tire T2 proximate the lagging side thereof, as is the case with arm 15. However, the roller 16c of the arm 16 as can be clearly seen in FIGS. 7 and 8 will lock the arm 16 in its operating position because of engagement with the surface 50 along channel C.

Figure 9:
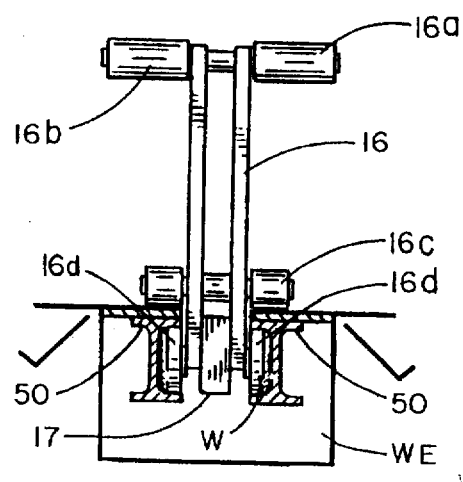
FIG. 9 is a front view of a single chocking device installed within a pit and illustrated in a preferred embodiment of the invention.

Referring now to FIG. 9 a single chocking device is illustrated in a pit with a doily 17 movable in the pit as an alternative embodiment of the invention. Only arm 16 is illustrated clearly in FIG. 9, however, the mechanics thereof, and the operation thereof, are very similar to the remaining illustrations and those skilled in the art will appreciate the operation.

Figure 15:
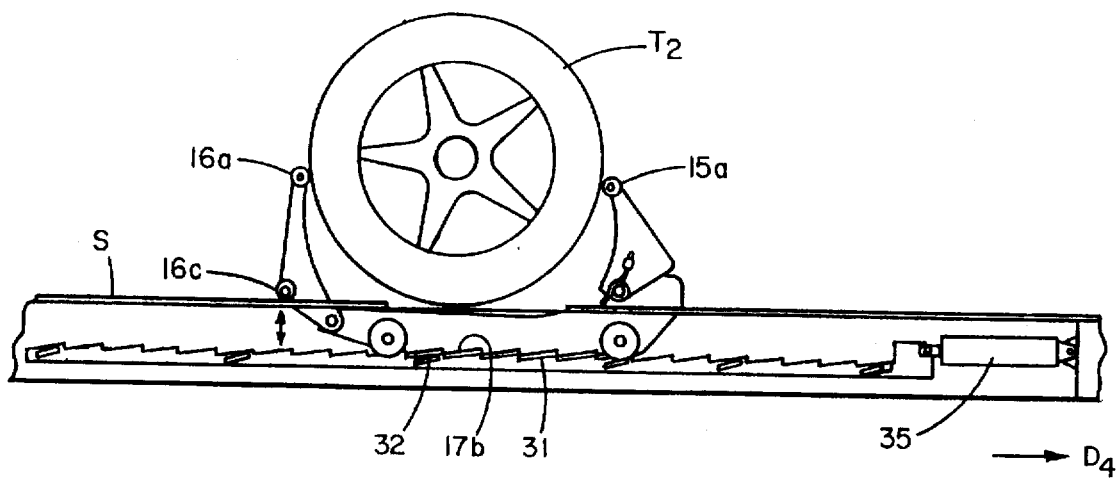
Figure 16:
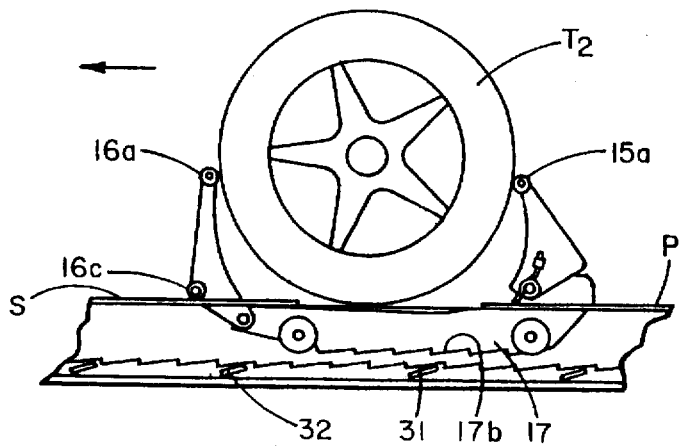
FIGS. 16 through 18 illustrate the release sequence of the tire T2, as the trailer moves from the ramp and the loading/unloading dock, all Figures being illustrated in a preferred embodiment of the invention.

Referring to FIG. 10 there is illustrated the dolly 17 and the locking member 30 separate from the channel C to illustrate the interrelationship of the components therefore. The dolly 10 therefore includes arms 15 and 16 adjacent each side thereof, with the arm 15 being resiliently biased by a torsion spring 15b locked by portions 15c and 15d proximate the tynes thereof. Therefore when the leading tire T2 engages the arm 15 via the roller 15a the arm will yield under the compression of the spring 15b. Different tire sizes cause the arm to move to the positions as best seen in relation to FIGS. 19 through 21. The arm 16 however will be locked in a permanent position because of the engagement of roller 16c with the supporting surface 50 along the channel C. The wheels therefore W move the dolly 17 from the initial position wherein the truck leading tire T2 engages arm 15 while arm 16 is recessed into channel C below the level of the ramp surface 21 until raised to an operating position wherein both arms align with the tire. As best seen in FIGS. 15 and 16 an operating position becomes a chock position wherein the locking member 30 is moved via a cylinder 35, as best seen in relation to FIG. 15 to cause the ratchet portion 17b of dolly 17 to engage with the ratchet portion 31 in response to openings 32 of the ratcheting bar or member 30 riding up on portions (not shown) of channel C, thereby locking the dolly and chocking mechanism 10 in its final chock position adjacent the dock.

Figure 11:
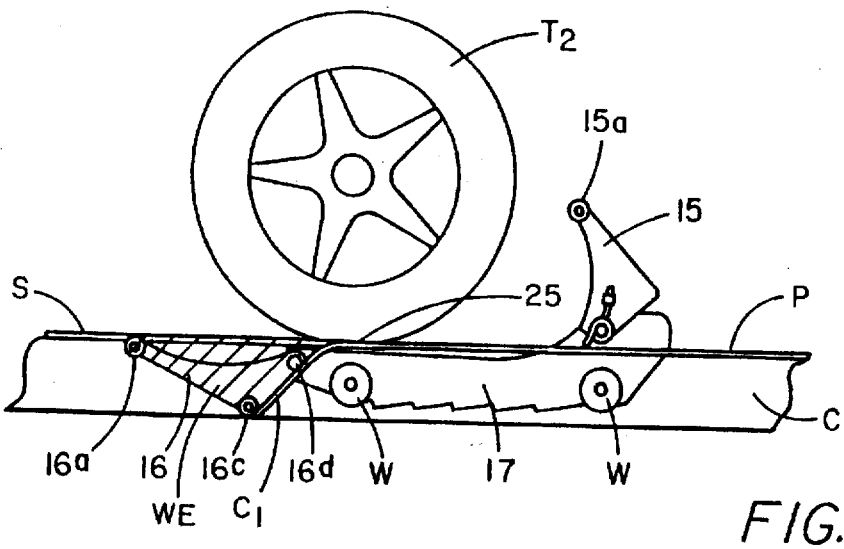
FIGS. 11 through 15 illustrate in side schematic view the chocking of tire T2 from the point when the tire T2 approaches the chocking device in FIG. 11 through to the capturing of the wheel T2 in FIG. 14 and the locking thereof in FIG. 15.
Figure 12:
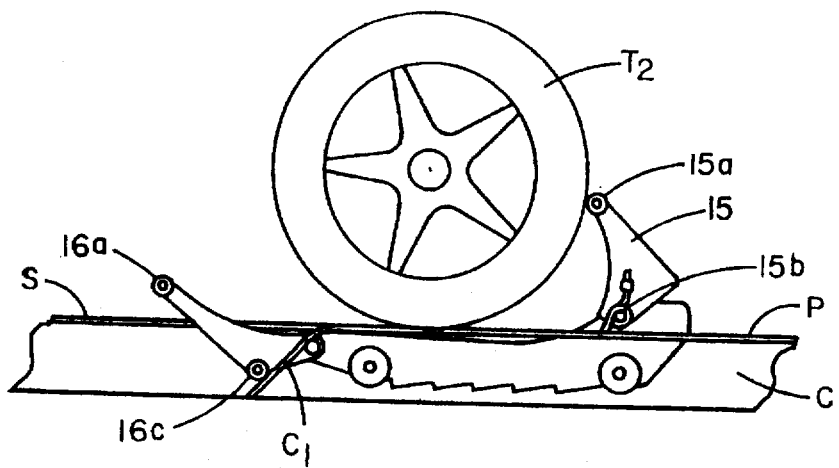
Figure 13:
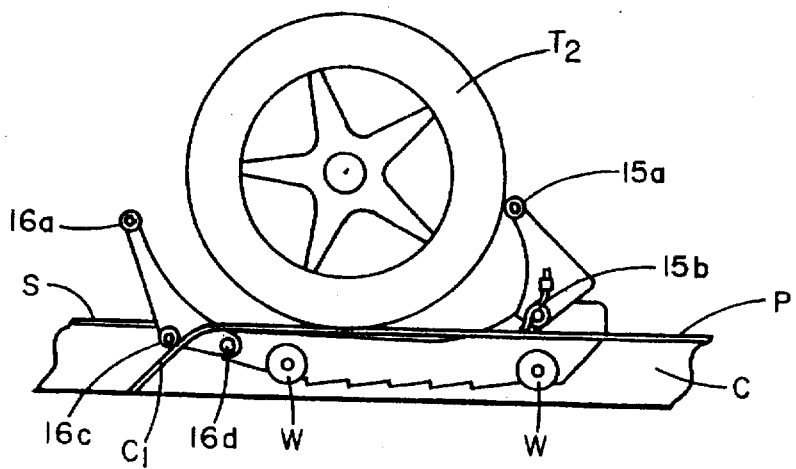
Figure 14:
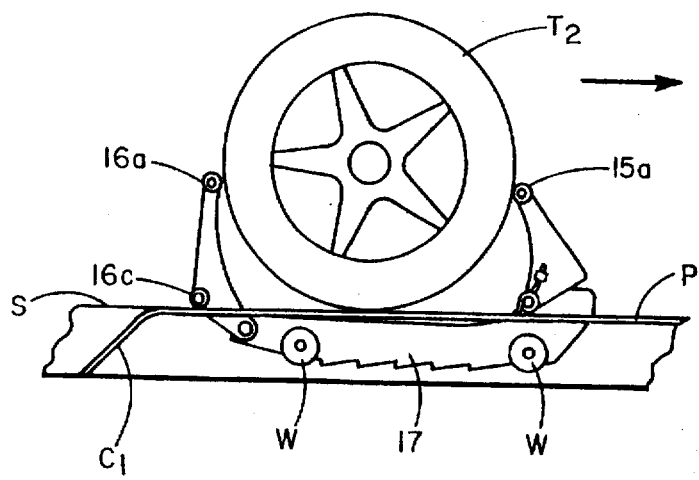

Referring now to FIGS. 11 through 15 there is illustrated a sequential view of the movement of the leading tire T2. The tire T2 therefore moves on the supporting surface S and approaches the arm 15 sitting in a position to ensure that the tire T2 will engage the arm 15. As seen in relation to FIG. 6, since there may be duplicates of the chocking device on each side of the truck it is presumed that the driver is operating the track correctly and is backing into the dock in a square manner. The tire T2 therefore will engage the arm 15 of the chocking device 10 and will therefore drive the chocking device back in the channel C toward the dock. The dolly 17 therefore on wheels W will provide the motion of the dolly within the channel C. The ramp portion $C_1$ of the channel C maintains the arm 16 in a recessed position as shown in FIG. 11, until such time as the roller 16c begins to ride up the incline portion $C_1$ of the ramp when as the arm 16 engages the tire, as best seen in relation to FIG. 14. The incline $C_1$ acts as an operator to pivot arm 16. The entire motion of the dolly to the various operating positions is effected by the movement of the tire only. There is no operating mechanism for the dolly to move other than by the truck activated motion provided by the truck itself. The change from an operating position to a chock position of the device is accomplished by cooperation of doily ratchet 17B with operator controlled ratchet 31. When the arm 16 reaches the position established in FIG. 14 the roller 16c will therefore rigidify arm 16 providing positive capturing of the tire T2 in that position. However, the dolly is still free to move in either direction in response to rolling motion of the tire until such time as the wheel T2 reaches the desired chock position. As shown in FIG. 15 at that position the locking member described in relation to FIG. 10 engages the ratcheting portion proximate the bottom of the dolly. The engagement of ratchet portion 31 with the ratchet portion 17b is effected by the cylinder 35 drawing locking bar 30 to the right causing upward motion of bar 30 as slots 32 ride up on projections from channel C (not shown). The chocking device 10 is thereby in its chock position so that the truck may be safely unloaded with the rear most wheel being chocked and the truck locked in its loading/unloading position. This will continue until such time as the unloading/ loading has been completed and when the truck desires to move away from the loading/unloading area.

Figure 17:
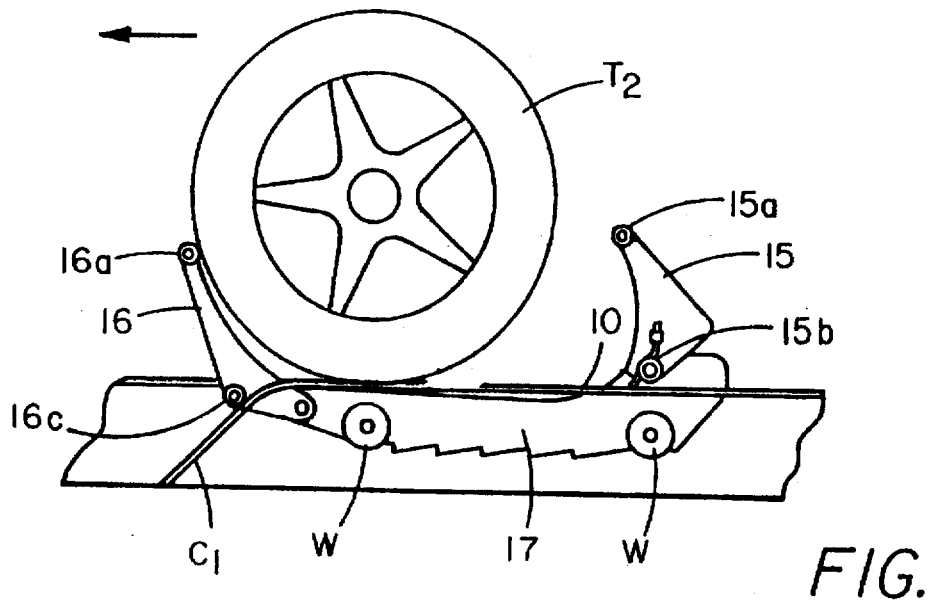
Figure 18:
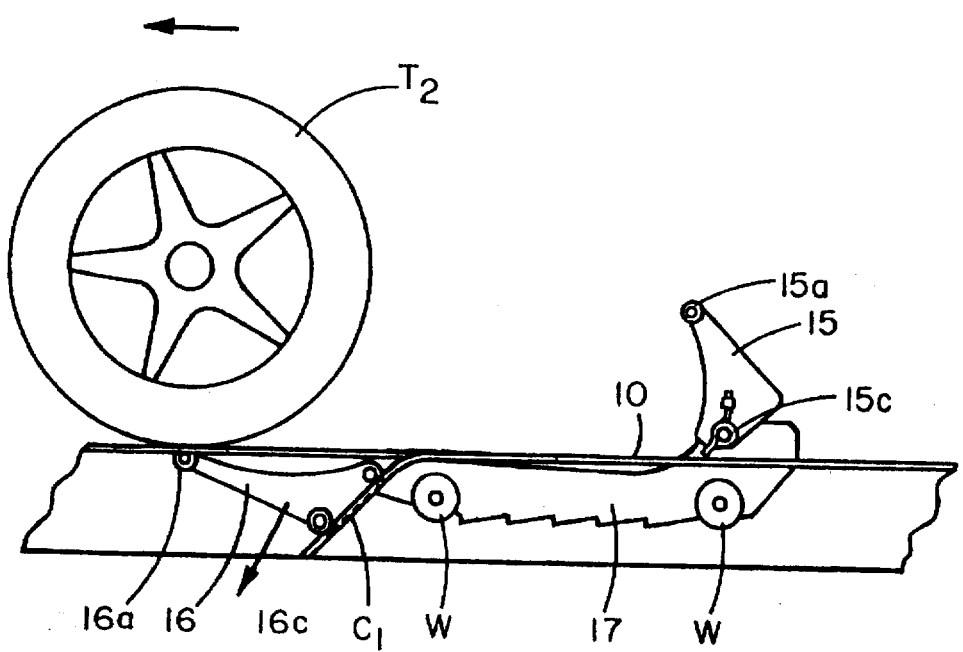

As illustrated in relation to FIGS. 16 through 18 the reverse of the operation of the chocking device occurs. Firstly, the cylinder 35 unlocks the ratcheting portions of the latching bar and dolly 31 and 17b respectively through the action of slots 32. Therefore the wheel T2 is free to rotate in a direction shown as the trailer moves off of the loading position, bringing the dolly to the position shown in FIG. 17 wherein arm 16 will again move downwardly away from the wheel T2 and be hidden below the treadway surface S and in well WE of channel C to allow the wheel T2 to pass there over, as best seen in FIG. 18, while the leading arm 15 remains in position for the next approaching truck. In doing so clearly, the portion 16c of the arm 16 permits travel of the arm back down into its recessed position, as best seen in its final recessed position in relation to FIG. 18.

Figure 19:
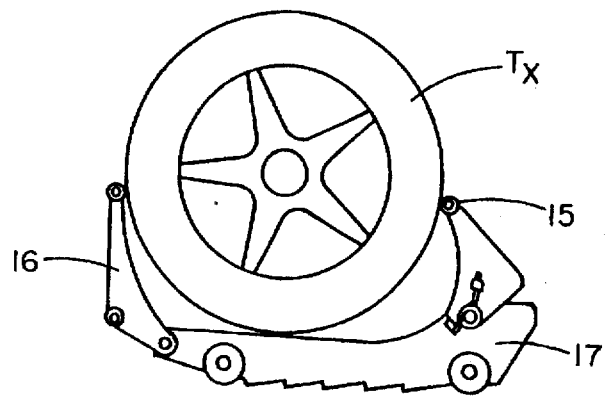
FIGS. 19, 20 and 21 illustrate the flexibility of the chocking device to accept variable size tires illustrated in a preferred embodiment of the invention.
Figure 20:
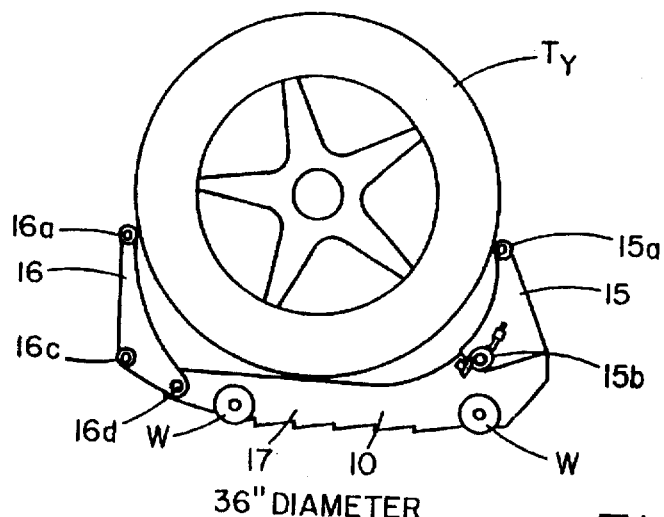
Figure 21:
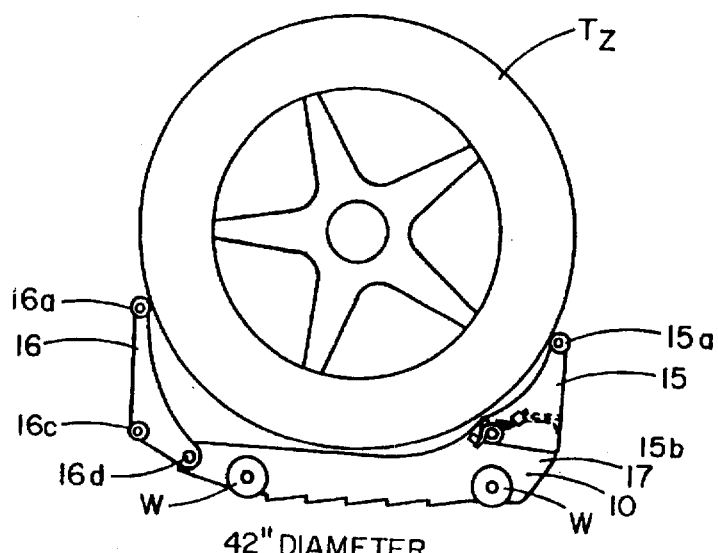

Referring now to FIGS. 19 through 21 there is illustrated the chocking device 10 engaging alternative size tires Tx, Ty and Tz via the arm 16 and 15, wherein a wheel size variance from, 30 inches to 42 inches for example, may be accommodated by the chocking device with a standard size dolly 17 and arm 16 and 15 because of the spring biased nature of arm 15 via spring 15b. In this manner the chocking arm 16 plays the vital role of chocking, while the activating arm 15 plays the vital role for bringing the chocking arm 16 into its upwardly inclined position.

As many changes can be made to the invention without departing from the scope of the invention, it is intended that all material contained herein by interpreted as illustrative of the invention and not in a limiting sense.

I claim as my invention:

1. An automatic vehicle actuated wheel chocking device for at least one tire of a vehicle which is rotatable on a treadway between an initial position and a plurality of operating positions, the chocking device comprising an engaging mechanism for initially engaging a tire at the initial position and movable to operating positions with the tire as it rolls on the treadway, a chock operably attached to the engaging mechanism and positionable behind the tire when the mechanism is in any of the operating positions in response to engagement of the mechanism by the rolling tire, and a controllable lock capable of selectively locking the chock in a chock position behind the tire corresponding to any one of the operating positions.

2. The system including the device of claim 1, wherein the chocking device comprises a connector for connecting the engaging mechanism and the chock to move them together in response to the movement of the tire along the treadway, a channel assembly extending along the treadway for receiving the connector and carrying the connector between the initial and operating positions.

3. The system of claim 2 wherein the channel assembly is disposed in the treadway substantially underneath the path of the tire.

4. The system of claim 2 wherein the channel assembly is disposed so that it is laterally spaced relative to the tire.

5. The system of claim 4 wherein the engagement mechanism extends outwardly from the channel assembly into the path of the tire for engaging the tire of the incoming vehicle.

6. The system of claim 4 wherein the channel assembly is disposed above the treadway.

7. The system of the claim 4 wherein the channel assembly is disposed below the treadway.

8. The device of claim 1 wherein the chocking device comprises a connector for connecting the engaging mechanism and the chock to move them together in response to the movement of the tire and the lock engages the connector for locking the chock in the chock position.

9. The device of claim 8 wherein the chock is movable from a lowered position to a raised, chocking position behind the tire, and wherein the chocking device comprises a channel assembly extending along the treadway for receiving the connector, the channel assembly including a surface for engaging the chock and locking the chock in the raised chocking position.

10. An automatic vehicle actuated wheel chocking device for at least one tire of a vehicle which is rotatable on a treadway between an initial position and a plurality of operating positions, the chocking device comprising an engaging mechanism for initially engaging a tire at the initial position and movable to operating positions with the tire as it rolls on the treadway, a chock positionable behind the tire when the mechanism is in any of the operating positions in response to engagement of the mechanism by the rolling tire, a dolly pivotally receiving the chock and connecting the engaging mechanism and the chock to move them together in response to the movement of the tire along the treadway, a controllable lock capable of selectively locking the chock in a chock position behind the tire corresponding to any one of the operating positions.

* * * * *

UNITED STATES PATENT AND TRADEMARK OFFICE
CERTIFICATE OF CORRECTION

PATENT NO. : 5,664,930
DATED : September 9, 1997
INVENTOR(S) : Elwood B. Ellis

It is certified that error appears in the above-identified patent and that said Letters Patent is hereby corrected as shown below:

col. 5, line 14, delete "not shown, shown" and insert therefor --not shown,--.

Signed and Sealed this

Ninth Day of December, 1997

Attest:

BRUCE LEHMAN

Attesting Officer

Commissioner of Patents and Trademarks